United States Patent [19]

Briet

[11] Patent Number: 4,887,665
[45] Date of Patent: Dec. 19, 1989

[54] CONNECTION SYSTEM FOR INTERCONNECTING A HEAT EXCHANGER AND A PIPE UNION

[75] Inventor: Gilles Briet, Gueugon, France

[73] Assignee: Hutchinson, France

[21] Appl. No.: 305,745

[22] Filed: Feb. 2, 1989

[30] Foreign Application Priority Data

Feb. 2, 1988 [FR] France ............... 88 01188

[51] Int. Cl.$^4$ ............................................. F28F 9/00
[52] U.S. Cl. .................................. 165/76; 165/173; 165/176; 285/27; 285/137.1
[58] Field of Search ................ 165/76, 173, 176; 285/27, 24, 331, 137.1

[56] References Cited

U.S. PATENT DOCUMENTS

| | | | |
|---|---|---|---|
| 3,202,442 | 8/1965 | Abbey | 285/331 |
| 3,640,552 | 2/1972 | Demier | 285/319 X |
| 4,244,194 | 1/1981 | Haesters | 105/173 X |
| 4,586,566 | 5/1986 | Kern | 165/173 |
| 4,665,972 | 5/1987 | Potier | 165/76 |

FOREIGN PATENT DOCUMENTS 1455850 9/1966 France .
2249299 5/1975 France .

Primary Examiner—Alan Cohan
Attorney, Agent, or Firm—Jacobs & Jacobs

[57] ABSTRACT

A connection system for interconnecting a heat exchanger and a pipe union, in which the pipe union (1) opening out into an opening (6) of the water box (2) of the heat exchanger is fixed firstly to a flexible pipe in permanent manner and secondly to the water box (2) by an easily released resilient connection. First axially projecting guide means (3) fixed to the pipe union (1) slide over second guide means (4) fixed to the inside surface of the water box (2), with said first and second means being configured to co-operate with each other. The invention is applicabhle to providing rapid action connections in the automobile industry.

16 Claims, 4 Drawing Sheets

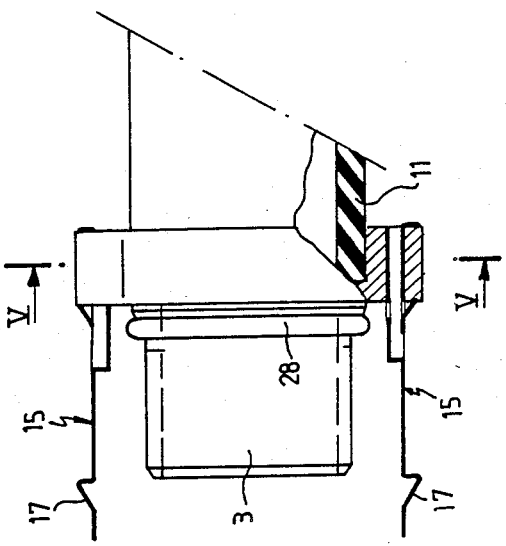

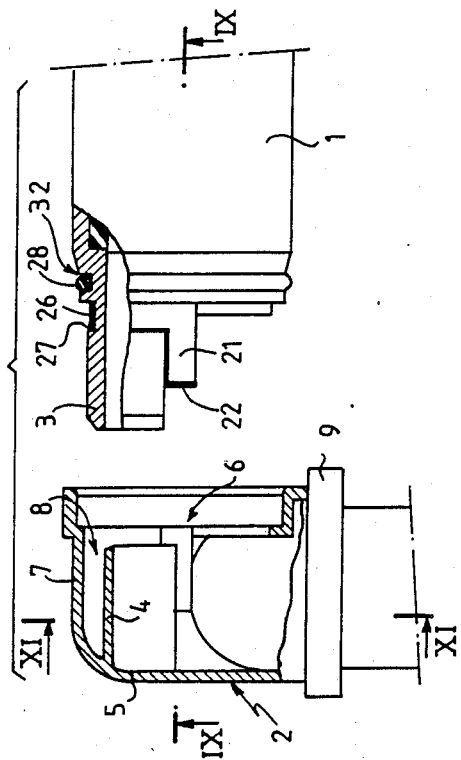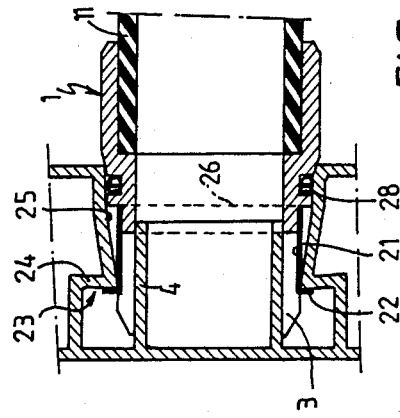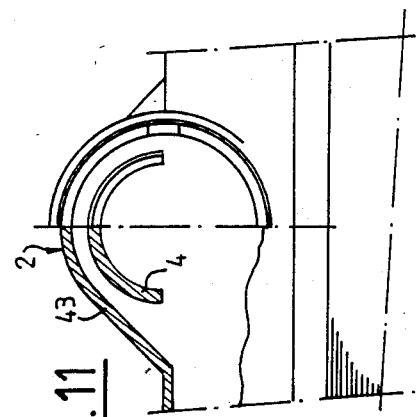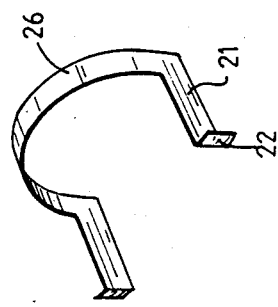

CONNECTION SYSTEM FOR INTERCONNECTING A HEAT EXCHANGER AND A PIPE UNION

The present invention, made with the participation of VALEO Corporation, relates to a connection system for interconnecting a heat exchanger and a pipe union, in which the pipe union opens out into the water box of the heat exchanger and is fixed to the water box by a resilient connection which is easily disassembled.

BACKGROUND OF THE INVENTION

In prior systems, the pipe union (which is connected to a flexible pipe, referred to a "Durit") engages in various different ways in a connection tube projecting from the water box of the heat exchanger.

Unfortunately, the presence of this projecting connection tube complicates the operation of crimping the water box to the perforated plate which connects the water box to the bundle of heat exchanger tubes, and it also increases the overall size of the assembly, which has undesirable consequences for assembly operations on motor vehicles.

An object of the present invention is therefore to eliminate this drawback and make it possible to provide an interconnection between a heat exchanger and a pipe union in which the water box no longer needs a projecting connection tube for connection to the pipe union.

Another object of the invention is to provide a device for locking together an assembled heat exchanger and pipe union, and which is compatible with the solution adopted for eliminating the projecting connection tube on the water box.

SUMMARY OF THE INVENTION

The present invention provides a connection system for interconnecting a heat exchanger and a pipe union, in which the pipe union opens out into an opening in the water box of the heat exchanger and is fixed firstly to a flexible pipe by means of a permanent connection and secondly to the water box by means of a resilient connection which is easily disassembled, with sealing between the pipe union and the water box being provided by an elastomer sealing ring which is radially compressed therebetween, said connection system including the improvement of an axially projecting first guide means fixed to the pipe union and a second guide means fixed to the inside surface of the water box and having a configuration enabling it to co-operate with the first guide means.

In an advantageous embodiment of the system of the invention, the first guide means is constituted by an axially oriented projecting guiding fingernail and said second guide means is constituted by guiding partition projecting from fingernail is intended to slide, said partition projecting from a first wall of the water box facing said opening therein and delimiting, in conjunction with a second wall of said water box extending substantially parallel to said partition, a housing in which said guiding fingernail penetrates and is imprisoned when the pipe union is assembled with the water box.

In a preferred embodiment of the connection system of the invention, the guiding fingernail and the guiding partition both have cross sectional profiles defined by circumferential arcs whose extent must be kept as small as possible in order to minimize head loss in the flow of fluid through the heat exchanger.

According to the invention, the releasable connection between the pipe union and the water box is constituted by a locking device of the type comprising at least one axially oriented tine which is radially resilient, which tine is provided with a catch at its free end or co-operating, for locking purposes, with stop or abutment means.

In a first embodiment, the locking device comprises two tines disposed on the outside of the connection system and integrally formed with one of the two portions constituted by the pipe union and the water box, with the abutments for co-operating with each of the catches being disposed on the other one of said portions.

In an advantageous variant of this embodiment, the locking device comprises two tines disposed on the outside of the connection system and constituted by metal tines which are fixed to one of the portions constituted by the pipe union and the water box.

According to the invention, in either case the abutments with which the locking tines co-operate are advantageously in the form of tubular lugs in which corresponding tines are engaged with the catches on the tines coming into abutment with the distal ends of the tubular lugs.

In a second embodiment, the locking device comprises two tines carried by the guiding fingernails of the pipe union and having catches for snap-fastening inside the water box with two radial abutments provided on the wall thereof.

In a preferred disposition of this embodiment, the two internal tines are integrally formed with the guiding fingernail, and axial entrance and exit grooves are provided in the inside surface of the opening in the water box.

In an advantageous variant of this disposition, the two internal tines are metal tines carried by a thin metal halfring disposed around the guiding fingernail and received in a groove provided therein.

In addition to the above dispositions, the invention includes other dispositions which appear from the following description.

BRIEF DESCRIPTION OF THE DRAWINGS

Embodiments of the invention are described by way of example with reference to the accompanying drawings, in which:

FIG. 4 shows a variant embodiment of the locking device compared with the solution shown in FIGS. 2 and 3;

FIG. 5 is a section view on V through the solution shown in FIG. 4;

FIG. 6 is a side elevation constituting a detailed view of one of the metal tines which has fixed to the FIG. 4 pipe union by overmolding;

FIG. 7 shows another variant relative to the locking device of FIG. 4;

FIG. 8 is a plan view in partial section through a second embodiment of a connection system in accordance with the invention, showing the two portions of the assembly while they are separate;

FIG. 9 is a section view on IX through the assembly shown in FIG. 8 after the two portions have been engaged;

FIG. 10 is a perspective view showing the detail of the shape of the locking device used in the assembly of FIGS. 8 and 9;

FIG. 11 is a view on XI through the water box of FIG. 8;

FIG. 12 is a side view in partial axial section through a pair of connections fixed to the ends of two flexible pipes;

FIG. 13 is a front elevation view in partial section on XIII through the water box showing the inlet and outlet openings of the heat exchanger;

FIG. 14 is a plan view in partial section on XIV through the water box shown in FIG. 13; and FIFG. 15 is a section view on XV showing the configuration of the guiding fingernails on each of the components of the pair of connections shown in FIG. 12.

It should naturally be understood that the drawings and the corresponding portions of the description are given purely by way of example showing particular embodiments of the invention which should not be understood as being limited thereto.

MORE DETAILED DESCRIPTION

Figure 1:
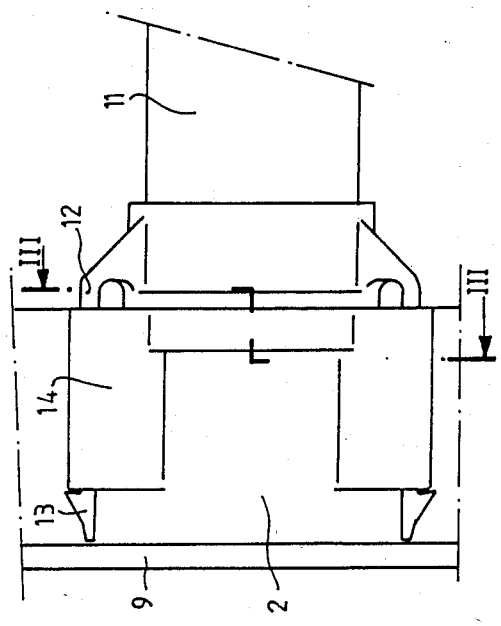
FIG. 1 is a plan view, partially in axial section, showing a first embodiment of a connection system in accordance with the invention.

The two connection systems shown in FIGS. 1 and 8 have in common the way in which the pipe union 1 engages in the water box 2, with both of said items being made of plastic material.

In each case, there can be seen a guiding "fingernail" 3 projecting from the pipe union 1 and a guiding partition 4 projecting from that one of the walls 5 of the water box 2 which faces the opening 5 provided in the water box.

The partition 4 and a roof or vault 7 running substantially parallel therewith define a housing 8 for receiving the guiding fingernail 3.

More particularly with reference to FIG. 1, it can be seen that this guiding fingernail 3 is almost fully engaged in the housing 8.

It can easily be understood that the penetration of the fingernail 3 into its housing inside the water box 2 makes it possible to omit the connection tube which, in prior art solutions, projects from the water box for enabling it to be connected to the pipe union. The absence of such a projecting tube makes it easier to crimp the perforated plate 9 to the water box 2. The crimped connection between the perforated plate and the water box can be seen in section in FIG. 1 (which also shows the bundle of tubes 19 of the heat exchanger) and the crimping can easily be performed prior to assembly with the pipe union 1. The absence of any portion projecting from the water box can be seen more clearly in FIG. 8 where the pipe union is shown at a distance from the water box.

Figure 3:
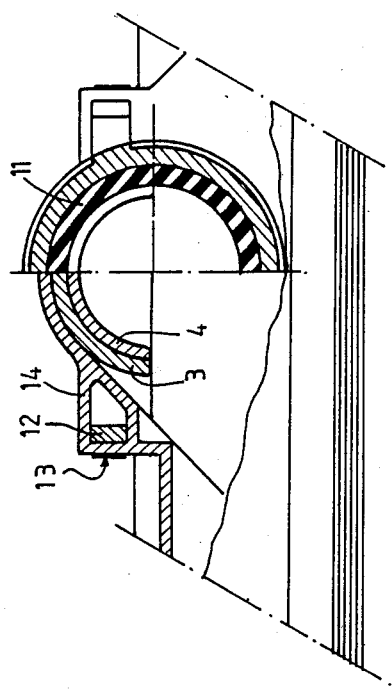
FIG. 3 is a section on III through the FIG. 2 assembly.

FIG. 3 shows a preferred configuration for the guiding fingernail 3 and for the corresponding guiding partition 4, both of which are defined by respective semicircles, but in general, any circumferential arcuate configuration is possible providing a passage is left for passing a sufficient fluid flow rate from the water box to the flexible pipe 11, or vice versa.

Figure 2:
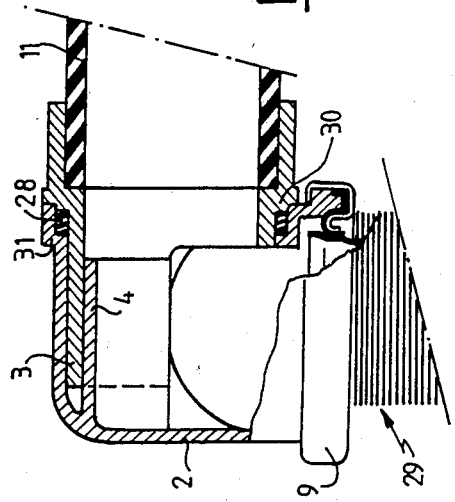
FIG. 2 is a partially cut-away side elevation showing one possible way of implementing the locking device.

Locking between the water box 2 and the pipe union 1 is illustrated in FIG. 2 showing two resilient tines 12 integrally molded with the pipe union and oriented axially. The tines are resilient in the radial direction and they are provided at their free ends with snap-fastening catches 13. Each catch engages against the distal end of a tubular lug 14 in which the corresponding tine is received.

Alternatively, the resilient locking tines could be added-on metal tines such as the tines 15 in FIGS. 4 and 6, where they are shown as being assembled by being snap-fastened in fixing lugs 16, or else they could be fixed to the pipe union by overmolding.

FIG. 6 shows the configuration of the added-on tines 15 more clearly, said tines having catches 17 for snap-fastening behind the distal ends of the above-mentioned tubular locking lugs 14.

FIG. 7 shows a variant embodiment of the add-on metal tines 15 which are shown as projecting from a resilient metal split ring 18 which may be received in a neck provided in a collar 19 integrally molded with the pipe union 1, or which may be overmolded together with the collar 19. A reinforcing member 20 opposes any tendency of the lips of the split ring 18 to separate during unlocking operations performed by moving the resilient tines 15 radially towards each other.

FIGS. 8 to 10 show another embodiment of the connection system of the invention in which a different solution is adopted for the locking device. Here again, the locking device includes two axial tines which are resilient in the radial direction, but instead of providing locking outside the water box, they make it possible, advantageously, to obtain locking inside the water box.

To this end, the resilient tines 21 are carried by the guiding fingernail 3 and their catches 22 bear against two radial abutments 23 provided on the inside wall of the water box 2 (see FIG. 9).

These abutments 23 have a retaining surface 24 which is substantially radial and an axial leading surface 25 which is flared outwardly towards the opening in the water box.

This non-limiting embodiment of the internally engaging tines 21 (whose shape can be seen more clearly in FIG. 10) is constituted by add-on tines integrally formed with a thin metal half-ring 26 disposed around the guiding fingernail 3 and received thereon in a neck 27 (see FIG. 8).

However, the internally engaging tines could also be formed integrally with the guiding fingernail of the pipe union.

FIG. 11 shows that the connection between the wall 7 of the water box and the wall to be found on either side of the opening 3 in said water box is defined by a sloping segment 43 extending tangentially outwardly (instead of being concentric with the guiding partition 4), thereby enabling the catches 22 of the locking tines to be disengaged when the pipe union 1 is rotated about its axis.

The position of the sealing ring 28 in the two embodiments shown in FIGS. 1 and 8 should be observed.

In FIG. 1, the elastomer sealing ring is merely disposed on the extension of the guiding fingernail 3 and engages an outwardly directed shoulder 30 from which said fingernail itself projects.

The elastomer ring 28 is disposed between the shoulder 30 on the pipe union 1 and a shoulder 31 in the opening to the water box and it is radially compressed between the water box and the pipe union.

In FIG. 8, because there is a neck 27 for receiving the metal ring 26 carrying the resilient tines 21, the elastometer ring 28 is itself received in a neck 32 provided in the vicinity of said neck 27.

The solution using external locking tines (as shown in FIGS. 1 and 7) makes it possible to disassemble the pipe union from the water box merely by moving it away axially, unlike the solution using internal locking tines as shown in FIGS. 8 to 11 in which unlocking is obtained by rotating the pipe union. As a result, the external locking tine solution can be used for providing pairs of connections based on the fundamental principle of the invention which consists in co-operation between a guiding fingernail and a guiding partition.

To this end, it should be specified that a pair of connections is applicable for the case where both the inlet and the outlet of a heat exchanger water box are to be found on the same water box (i.e. on the same side as the heat exchanger) because it is then possible to put the inlet and outlet openings close to each other. Naturally, a partition separating the inlet and the outlet is provided inside the water box when the inlet and the outlet are located on the same side of the heat exchanger in order to ensure that fluid flows properly through the heat exchanger.

Figure 12:
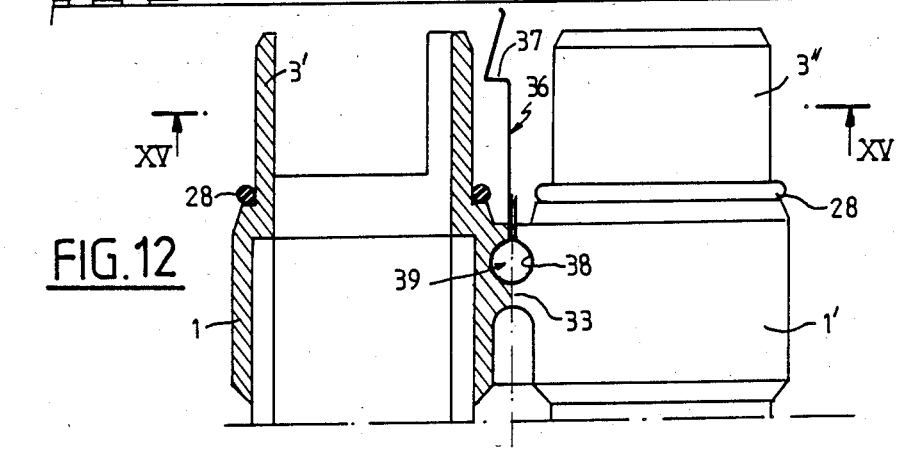

In this case, because the inlet and with the outlet of the water box are close together as shown in FIG. 12, the pipe unions associated therewith may be made as a single piece (constituting "a one-piece two-pipe union"), where FIG. 12 is a section through a pipe union 1 which is twinned with a second pipe union 1' (seen from the outside) by means of a connecting bridge 33 which is integrally molded with both of them.

Figure 13:
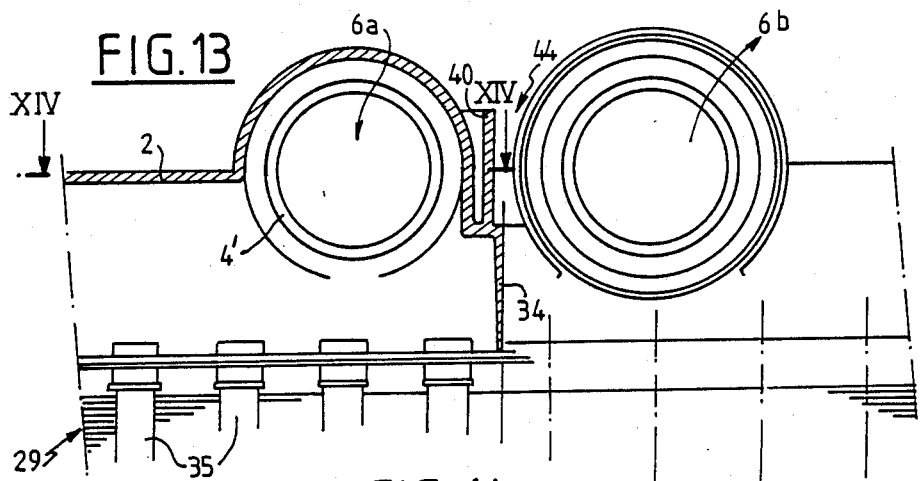
FIGS. 12 to 15 show an application of the principle of fingernail and guide partition assembly to providing inlet and outlet connections when the inlet and outlet openings of a heat exchanger are on the same side of a water box and close together, and in particular.
Figure 14:
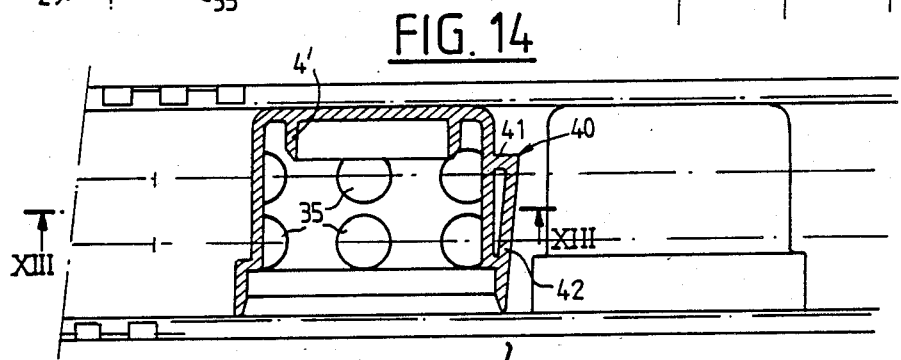

FIGS. 13 and 14 show the water box 2 having its inlet and outlet openings 6a and 6b close together and separated by a partition 34 (see FIG. 13). These figures also show the individual tubes 35 in the above-mentioned bundle 29 of heat exchanger tubes.

The height of the partition 34 is less than the height of the water box thereby defining a depression 44 in the wall of the water box between the two component pipe unions 1 and 1', and thus leaving room between the two pipe unions 1 and 1' to receive a resilient locking tine 36 provided at its free end with a snap-fastening catch 37.

The fixed end 38 of the tine 36 is received in a hollow 39 provided in the connecting bridge 33 between the twinned pipe unions 1 and 1'.

The snap-fastening catch 37 is intended to bear against an abutment 40 when the twinned union 1-1' is assembled with the water box 2, with said abutment 40 being integrally molded with one of the two water box ports (in particular the port which co-operates with pipe union 1, see FIGS. 13 and 14), and being disposed in the above-mentioned depression 44.

The abutment 40 provides a retaining surface which is substantially perpendicular to the approaching pipe union 1 and a sloping approach surface for camming the catch 37 away from its snap-fastening direction.

Figure 15:
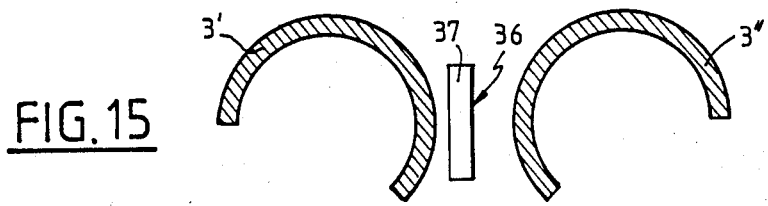

The configuration of the guiding fingernails is illustrated in FIG. 12 and in particular in FIG. 15 which is a section on XV through FIG. 12. The circumferential arc defining each of the guiding fingernails 3' and 3" extends, in this case, over a relatively large angle, unlike in FIGS. 3 and 8, given that each of the guiding fingernails in a two-pipe union may extend adjacent to the partition 34 without interferring with the flow of fluid through the water box.

The guiding partition co-operating with the guiding fingernail of each of the pipe unions 1 and 1' is of a height of smaller axial extent than shown in FIGS. 1 and 8 in order to avoid masking the tubes 35 of the heat exchanger (see FIG. 14). By virtue of this reduced extent, the partition may be made in the form of a simple annular rib 4' over which the end of the corresponding guiding fingernail 3' slides during assembly of the two-pipe union with the water box.

It can be seen from the above that the invention is not limited to any of the embodiment or applications described in greater detail. On the contrary, the invention extends to any variant which may occur to the person skilled in the art without going beyond the scope of the accompanying claims. In particular, although the fixing between the plastic pipe union and the flexible elastomer pipe is shown as being obtained by bonding (by molding the pipe union directly onto the pipe), this fixing could naturally be obtained by imprisoning the end of the pipe between the pipe union and an over-molded piece of plastic, or by clamping a metal collar around the pipe, or by gluing the pipe to the pipe union, or by any other equivalent means. Further, the guide means could also be constituted by an axial finger projecting from the pipe union and by an axial housing projecting radially inwardly from the wall of the water box, with said finger being received in said housing. Further, no embodiment is shown corresponding to a configuration in which internal locking tines are carried by the guiding fingernail and are integrally molded therewith, in which case the inside surface of the opening in the water box needs to be provided with inlet and outlet grooves: such a configuration is described in detail in a patent application relating to a different type of rapid action connection and filed simultaneously with the present application.

I claim:

1. A connection system for interconnecting a heat exchanger and a pipe union, in which the pipe union opens out into an opening in the water box of the heat exchanger and is fixed firstly to a flexible pipe by means of a permanent connection and secondly to the water box by means of a resilient connection which is easily disassembled, with sealing between the pipe union and the water box being provided by an elastomer sealing ring which is radially compressed therebetween, and connection system including the improvement of an axially projecting first guide means fixed to the pipe union and a second guide means fixed to the inside surface of the water box and having a configuration enabling it to co-operate with the first guide means.

2. A system according to claim 1, wherein the first guide means is constituted by an axially oriented projecting guiding fingernail and said second guide means is constituted by a guiding partitition over which the fingernail is intended to slide, said partition projecting from a first wall of the water box facing said opening therein and delimiting, in conjunction with a second wall of said water box extending substantially parallel to said partition, a housing in which said guiding fingernail penetrates and is imprisoned when the pipe union is assembled with the water box.

3. A system according to claim 2, wherein the guiding fingernail and the guiding partition both have cross sectional profiles defined by circumferential arcs.

4. A system according to claim 2, wherein the releasable connection between the pipe union and the water box is constituted by a locking device of the type comprising at least one axially oriented tine which is radially resilient, which tine is provided with a catch at its free end for co-operating for locking purposes, with stop or abutment means.

5. A system according to claim 4, wherein the locking device comprises two tines disposed on the outside of the connection system and integrally formed with one of the two portions constituted by the pipe union and the water box, with the abutments for co-operating with each of the catches being disposed on the other one of said portions.

6. A system according to claim 4, wherein the locking device comprises two tines disposed on the outside of the connection system and constituted by metal tines which are fixed to one of the portions constituted by the pipe union and the water box.

7. A connection system according to claim 4, wherein the abutments with which the locking tines co-operate are advantageously in the form of tubular lugs in which corresponding tines are engaged with the catches on the tines coming into abutment with the distal ends of the tubular lugs.

8. A system according to claim 4, wherein the locking device comprises two tines carried by the guiding fingernails of the pipe union and having catches for snap-fastening inside the water box with two radial abutments provided on the wall thereof.

9. A system according to claim 8, wherein the two internal tines are integrally formed with the guiding fingernail, and wherein axial entrance and exit grooves are provided in the inside surface of the opening in the water box.

10. A system according to claim 8, wherein the two internal tines are metal tines carried by a thin metal half-ring disposed around the guiding fingernail and received in a groove provided therein.

11. A system according to claim 10, wherein said second wall of the water box which, together with the guiding partition, serves to delimit the housing for said guiding fingernail is itself connected to adjacent portions on either side of the opening in the water box by wall segments which slope outwardly.

12. A connection system for interconnecting a heat exchanger with a set of pipe unions, in which first and second pipe unions open out into first and second openings (namely an inlet and an oulet) of a heat exchanger water box, said water box including a separating partition between said two openings, each pipe union being connected firstly to a corresponding flexible pipe via a permanent connection and secondly to the water box via an easily released resilient connection, wherein said two openings are close together while remaining disposed on opposite sides of the separating partition, wherein each of the pipe unions is as defined in claim 1, and wherein the two pipe unions are interconnected by a connecting bridge which is integrally molded therewith, with the pipe unions twinned in this way defining a single-piece two-pipe union.

13. A system according to claim 12, wherein the separating partition between the two openings of the water box is smaller in height than the depth of the water box, thereby defining a depression between the two openings corresponding to the two pipe unions, and wherein the locking device comprises a single add-on metal tine with its fixed end received in a hollow provided in the connecting bridge while the snap-fastening catch provided at its free end engages, when the two-pipe union is assembled with the water box, against an abutment provided on one of the two second guide means associated with the two openings of the water box, in the space defined by the depression in the wall of the water box.

14. A system according to claim 12, wherein each second guide means is relatively small in height relative to the depth of the water box and wherein each first guide means has the configuration of a circumferential arc.

15. A system according to claim 1, wherein the first guide means is constituted by an axial finger projecting from the pipe union and the second guide means is constituted by an axial housing projecting radially from the wall of the water box towards the inside of the water box, with said finger being intended to engage in said housing.

16. A connection system according to claim 5, wherein the abutments with which the locking tines cooperate are advantageously in the form of tubular lugs in which corresponding tines are engaged with the catches on the tines coming into abutment with the distal ends of the tubular lugs.

* * * * *